United States Patent [19]

Sugita

[11] Patent Number: 5,329,867
[45] Date of Patent: Jul. 19, 1994

[54] METHOD OF PRODUCING ACTIVE RICE HUSK ASH

[76] Inventor: Shuichi Sugita, 7-7 Aza Hohkohno, Ooaza Niida, Hachinohe-shi, Aomori-ken, Japan

[21] Appl. No.: 111,569

[22] Filed: Aug. 25, 1993

[30] Foreign Application Priority Data

Nov. 24, 1992 [JP] Japan .................. 4-334965

[51] Int. Cl.[5] .......................................... F23G 5/00
[52] U.S. Cl. .................. 110/346; 106/406; 110/246; 110/347
[58] Field of Search ............ 110/346, 347, 246, 226; 106/406

[56] References Cited

U.S. PATENT DOCUMENTS

| | | | |
|---|---|---|---|
| 3,959,007 | 5/1976 | Pitt | 106/406 |
| 4,049,464 | 9/1977 | Tutsek et al. | 106/406 |
| 4,829,107 | 5/1989 | Kindt et al. | 106/406 X |
| 5,010,831 | 4/1991 | Halfhide | 110/347 |

OTHER PUBLICATIONS

Proceedings Fourth International Conference, Istanbul, Turkey, May 1992: Fly Ash, Silica Fume, Slag, and Natural Pozzolans in Concrete S. Sugita, et al. pp. 495–512 "Evaluation of Pozzolanic Activity of Rice Husk Ash".

*Primary Examiner*—Edward G. Favors
*Attorney, Agent, or Firm*—Oblon, Spivak, McClelland, Maier & Neustadt

[57]  ABSTRACT

Active rice husk ash is produced by a method which includes placing a hollow platform having many holes of a size too small for rice husk to enter on an enclosed floor slab, erecting a chimney on the hollow platform in communication with the interior of the hollow platform, forming a cone of rice husk around the chimney to completely cover the hollow platform, igniting the rice husk at the small holes for smolderingly incinerating the rice husk into carbonized rice husk, and allowing the carbonized rice husk to self-burn into ash.

3 Claims, 5 Drawing Sheets

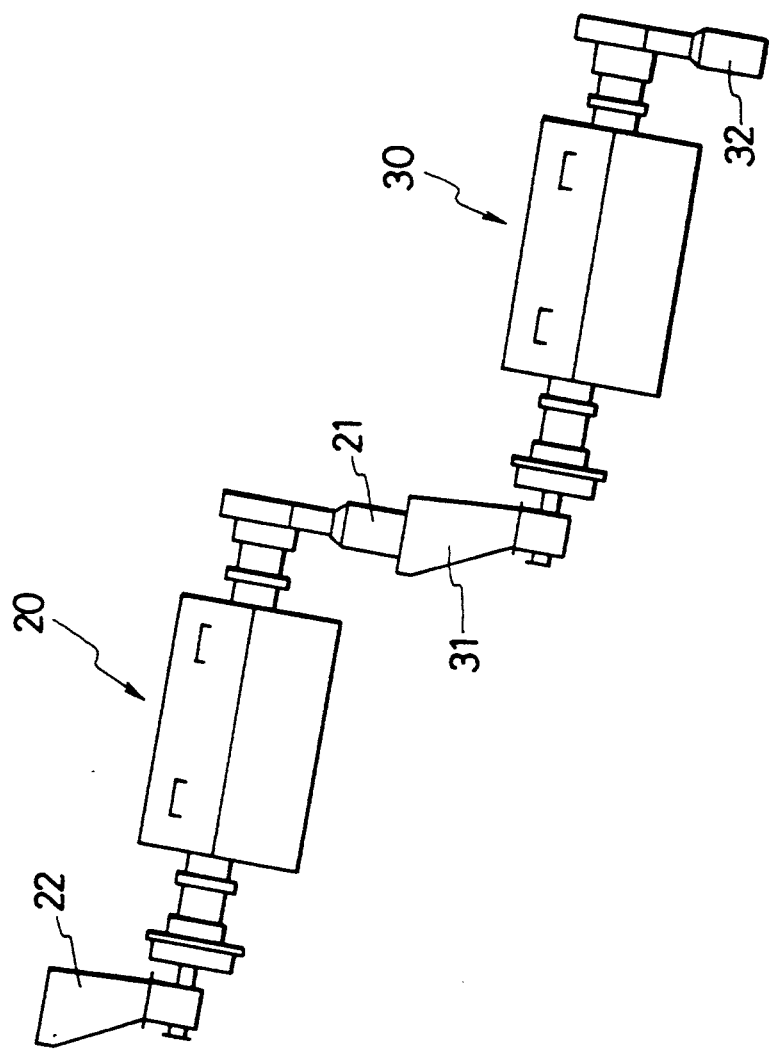

METHOD OF PRODUCING ACTIVE RICE HUSK ASH

BACKGROUND OF THE INVENTION

1. Field of the Invention

This invention relates to a method of producing active rice husk ash exhibiting a high degree of amorphousness and suitable for use as a concrete aggregate in place of fly ash, silica fume and the like.

2. Description of the Prior Art

In technology relating to rice husk and rice husk ash, the fundamental thinking has conventionally been first to consider rice husk as a heat source and second to try to find practical uses for the resulting rice husk ash. When rice husk is used a heat source, it is necessary to blow air into the rice husk after it is lit so as to achieve the highest combustion temperature possible. However, almost all of the rice husk ash obtained by such high-temperature burning is crystalline, very low in chemical activity and black in color. It therefore has few practical uses.

When air is blown into to the rice husk for burning it at high temperature, the resulting rice husk ash progressively crystallizes, a fact that can be readily confirmed from the X-ray diffraction pattern of the rice husk ash. The electrical conductivity of a saturated calcium hydroxide solution of the rice husk ash is very low, generally measuring around 0.3 mS/cm. Such rice husk ash cannot be expected to produce a significant effect when used as, for example, a pozzolan for concrete.

To be of high practical utility, moreover, a rice husk ash should preferably exhibit high chemical activity. It should also not be black. Since no method is available for low-cost industrial production of rice husk ash exhibiting high activity, there is a need for developing one.

At the Fourth CANMET-ACI International Conference on Fly Ash, Silica Fume, Slag and Natural Pozzolans in Concrete held in Istanbul, Turkey, between May 3 and May 8, 1992, the inventor on May 8 announced a method of using an ordinary muffle furnace as an electric furnace, charging 800 g of rice husk directly into the furnace, raising the temperature of the furnace from normal room temperature to 280° C. and maintaining it at this temperature for 1.5 hr, raising the temperature of the furnace to 350° C. and maintaining it at this temperature for 1.5 hr, raising the temperature of the furnace to between 400° C. and 800° C. and maintaining it at this temperature for 2 hr to conduct incineration, and removing rice husk ash from the furnace 5 hr later. Differently from rice husk ash obtained by directly igniting rice husk and burning it in a short time, the rice husk ash obtained by this method exhibited excellent chemical activity and was white in color. Since the method comprises two steps, the first for carbonization and the second for incineration, it will be referred to as the two-stage incineration method.

The object of the present invention is to provide a method for efficient production of white rice husk ash exhibiting chemical activity which is based on this two-stage incineration method.

SUMMARY OF THE INVENTION

In the batch method for producing active rice husk ash according to one aspect of this invention, a hollow platform having many holes of a size too small for rice husk to enter is placed on an enclosed floor slab, a chimney is erected on the hollow platform in communication with the interior of the hollow platform, a cone of rice husk is formed around the chimney to completely cover the hollow platform, the rice husk at the small holes is ignited for smolderingly incinerating the rice husk into carbonized rice husk, and the carbonized rice husk is allowed to self-burn into ash.

In the continuous method for producing active rice husk ash according to another aspect of this invention, downstream and upstream rotary kilns are connected in tandem, heating of the upstream rotary kiln is controlled to a temperature for carbonizing rice husk, heating of the downstream rotary kiln is controlled to a temperature for burning rice husk into ash, rice husk is supplied to the upstream rotary kiln to be smolderingly incinerated into carbonized rice husk therein, the carbonized rice husk is supplied to the downstream rotary kiln to be burned into ash therein, and the resulting active rice husk ash is discharged from the downstream rotary kiln.

As will be understood from the foregoing, since the present invention first carbonizes rice husk by burning it in an incineration furnace without flaming and then burns the carbonized rice husk into ash, it enables easy production of white rice husk ash exhibiting excellent chemical activity.

The above and other objects and features of the invention will be better understood from the following description made with respect to the drawings.

BRIEF DESCRIPTION OF THE DRAWINGS

FIG. 3 is an explanatory view of an embodiment of an apparatus for conducting the continuous method of producing active rice husk according to the present invention.

DESCRIPTION OF THE PREFERRED EMBODIMENT

Figure 1:
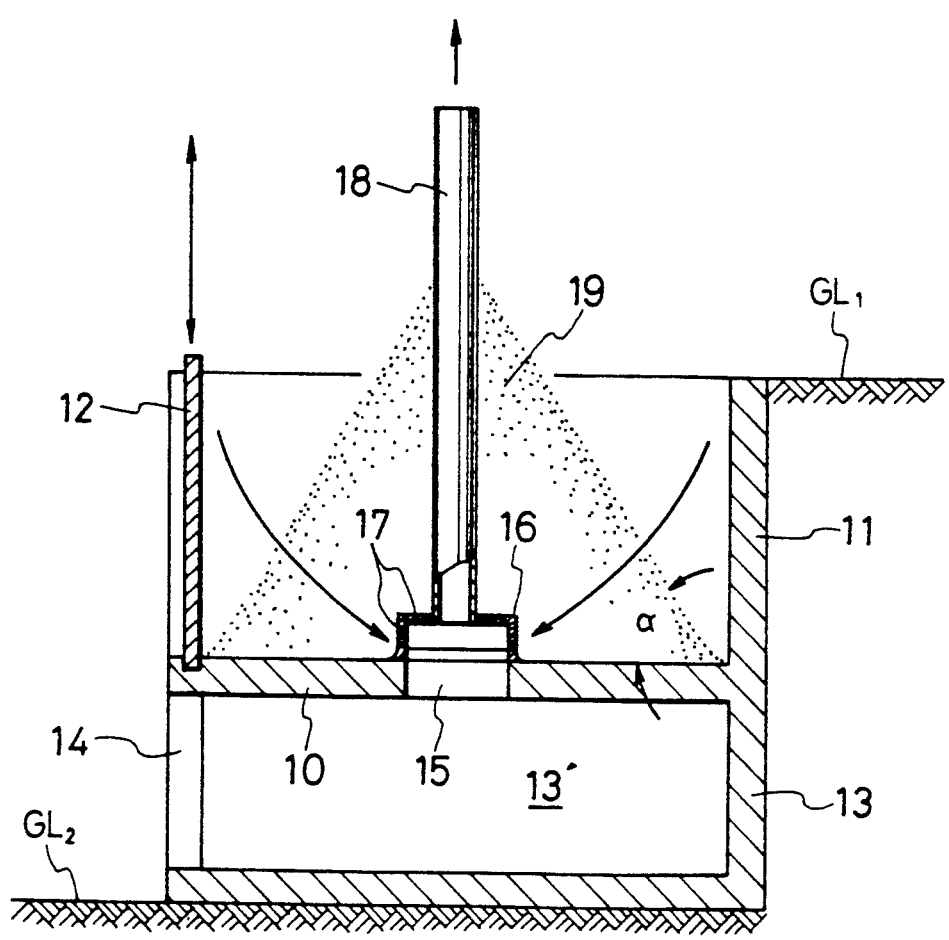
FIG. 1 is sectional view of an embodiment of an apparatus for conducting the batch method of producing active rice husk according to the present invention.
Figure 2:
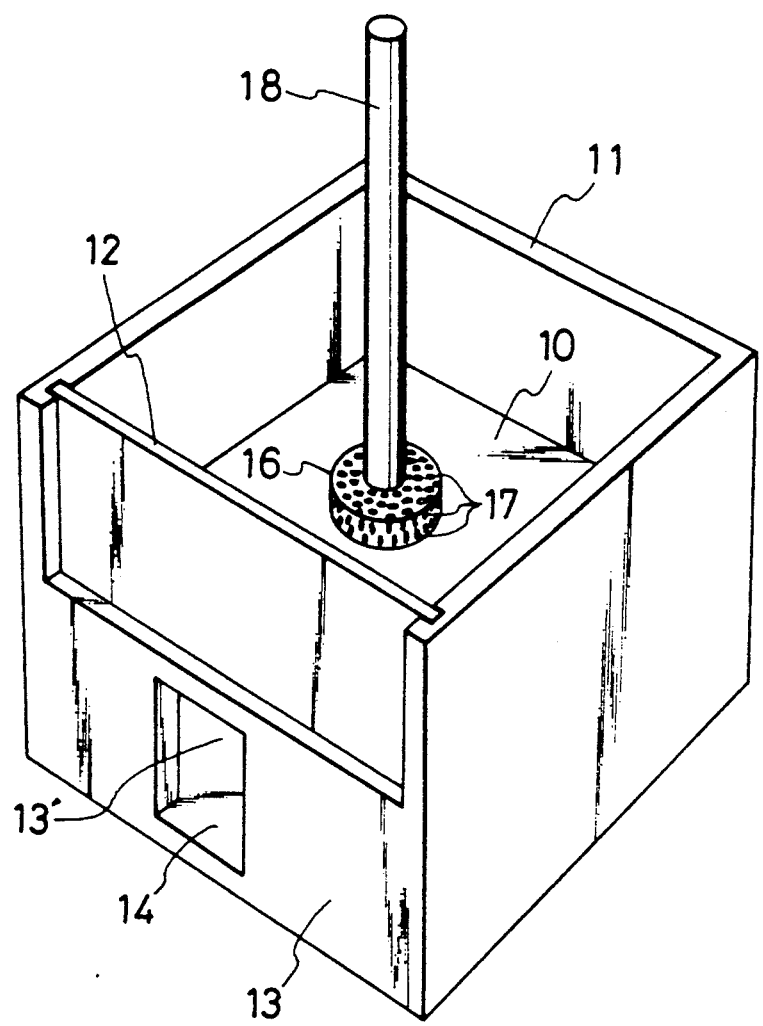
FIG. 2 is a perspective view of the apparatus of FIG. 1.

FIGS. 1 and 2 are explanatory views of a batch production apparatus for carrying out the method of producing active rice husk according to the present invention and FIG. 3 is an explanatory view of an apparatus for continuously carrying out the method.

In FIG. 1, reference numeral 10 denotes a concrete floor slab on which rice husk is stacked for burning. The floor slab 10 is enclosed on three sides by a three-walled enclosure 11 and the remaining side is provided with a vertically sliding shutter 12. The floor slab 10 is supported on a four-sided lower enclosure 13 that is provided on the side of the shutter 12 with an entrance 14 for the apparatus operator. The lower enclosure 13 is for defining a space 13' for setting fire to the rice husk. The space 13' is about 1 meter high.

An approximately 50-cm opening 15 is formed through the floor slab 10 to reach the side of the space 13'. A hollow platform 16 measuring 20–30 cm in height and slightly larger than the opening 15 in diameter is placed on the perimeter of the opening 15 and made unmovable. The surface of the hollow platform 16 is formed with many holes 17 measuring a few millimeters in diameter, a size too small for rice husk to enter.

A hole measuring about 12–15 cm in diameter is formed in the upper wall of the hollow platform 16 and a chimney 18 of a diameter slightly larger than the diameter of the hole is erected on the perimeter of the hole. The apparatus is installed at a step in the ground so that the ground surface $GL_1$ at the upper level of the step can be used by a dump truck or the like for dumping rice husk onto the floor slab 10 and the ground surface $GL_2$ at the lower level of the step can be used by a tank truck or the like for loading the product rice husk ash after the shutter 12 has been opened.

When rice husk is to be burned, rice husk is dumped onto the floor slab 10 enclosed by the enclosure 11 and the shutter 12 in such manner as to completely cover the hollow platform 16 and form a conical pile 19 around the chimney 18. When the size of the batch of rice husk to be burned is 500 kg, the angle of repose of the pile 19 is about 35° and the height of the pile is about 1.5 m, so that the floor slab 10 can measure about 3.5 m square and the enclosure 11 and the shutter 12 can be about 1.0 m high.

When the pile 19 is to be ignited, the operator enters the space 13' through the entrance 14 and sets fire to the rice husk at the holes 17 in the hollow platform 16 by inserting burning paper, cloth or the like into the opening 15 at the center of the floor slab.

Once the rice husk has been ignited, smoke and heat of combustion pass through the holes 17 in the hollow platform 16 into the interior of the hollow platform 16 and then rise to the exterior through the chimney 18, while air passes from the exterior through the pile 19 and into the interior of the hollow platform 16, as indicated by the arrows, whereafter it rises through the chimney 18 and is dispersed in the atmosphere together with the smoke. Flaming of the rice husk during the combustion is prevented by the smoke passing through the chimney. More specifically, since the rice husk is smolderingly incinerated at a temperature of about 370°–380° C., namely at a temperature lower than its fire point of 410° C., it is carbonized, i.e., becomes carbonized rice husk. When left as it is, the carbonized rice husk then self-burns at a temperature of about 700°–750° C. to become an ash, namely the white active rice husk ash which is the product aimed at by the method of this invention. When necessary, the rice husk ash can be comminuted with a ball mill or the like.

A 500 kg batch of rice husk requires about 24 hr to carbonize and about 48 hours to burn into ash following carbonization, and yields about 100 kg of active rice husk ash. These processing times can be regulated to some degree by varying the diameter and height of the chimney.

The aforesaid production method can be conducted without need for any complicated equipment and does not require the supply of electricity, gas or any other source of combustion heat other than that for igniting the rice husk at the start. The combustion of the rice husk proceeds solely by flameless self-burning and carbonization is achieved through the process of smoldering incineration.

The method thus enjoys the advantages of not requiring any heat source other than that for ignition and of enabling high volume production, notwithstanding that the burning may be somewhat uneven. Moreover, the method enables production of highly amorphous active rice husk ash exhibiting a difference in electrical conductivity of 2–3 mS/cm and a $SiO_2$ content of 90–95%.

FIG. 3 shows an apparatus for continuously producing active rice husk ash which comprises an upstream rotary kiln 20 and a downstream rotary kiln 30 connected in tandem via a material supply hopper 31. A burner, electric heater or other heat source (not shown) is controlled for heating rice husk in the upstream rotary kiln 20 to 300°–400° C. and for heating rice husk in the downstream rotary kiln 30 to about 600° C. The length of each rotary kiln is, for example, 1.5 m. The rice husk conveyance speed in the rotary kilns is adjusted so that rice husk supplied to a material supply hopper 22 of the upstream rotary kiln 20 is discharged as rice husk ash from a product discharge port 32 of the downstream rotary kiln 30 in about 1 hr. The waste heat from the downstream rotary kiln 30 is preferably used to preheat the rice husk in the material supply hopper 22 of the upstream rotary kiln 20. If convenient, the material supply hopper 31 can be removed from the product discharge port 21 of the upstream rotary kiln 20 and the two kilns be connected directly to each other. When the illustrated arrangement is employed, i.e., when the upstream product discharge port 21 is connected with the downstream material supply hopper 31, it is preferable to insulate the product discharge port 21 and the hopper 31.

During operation of the apparatus, rice husk supplied into the upstream rotary kiln 20 from the material supply hopper 22 is converted into carbonized rice husk as it is tumbled and conveyed through the upstream rotary kiln 20. The carbonized rice husk discharged from the upstream rotary kiln 20 through the product discharge port 21 and into the material supply hopper 31 is then supplied to the downstream rotary kiln 30. It is thereafter incinerated as it is tumbled and conveyed through the downstream rotary kiln 30 to be discharged from the product discharge port 32 of the downstream rotary kiln 30 as highly active rice husk ash of very high whiteness, a $SiO_2$ content of 92–95% and a difference in electrical conductivity of 6–6.5 mS/cm. When necessary, the rice husk ash can be comminuted with a ball mill or the like. For every 100 weight units of rice husk supplied to the upstream rotary kiln 20, 45 weight units of carbonized rice husk is obtained at the product discharge port 21.

This continuous production method employing two rotary kilns enables the temperature control for production of carbonized rice husk in the upstream rotary kiln 20 and the temperature control for burning the carbonized rice husk into ash in the downstream rotary kiln 30 to be separately controlled for optimum effect. This makes it possible to continuously produce active rice husk ash free of uneven burning and having a high degree of amorphousness, in a very short time. Although the method requires a heat source, it has the advantages of enabling recovery and effective utilization of the heat of combustion, being capable of continuous 24-hour operation, being highly efficient, and enabling large volume production of high quality rice ash.

As will be understood from the foregoing, in either of its aspects the method according to the present invention enables ready production of highly active rice husk ash exhibiting a high degree of amorphousness.

Examples of using rice husk ash produced by the method of this invention as an aggregate in concrete will now be given.

Figure 4A:
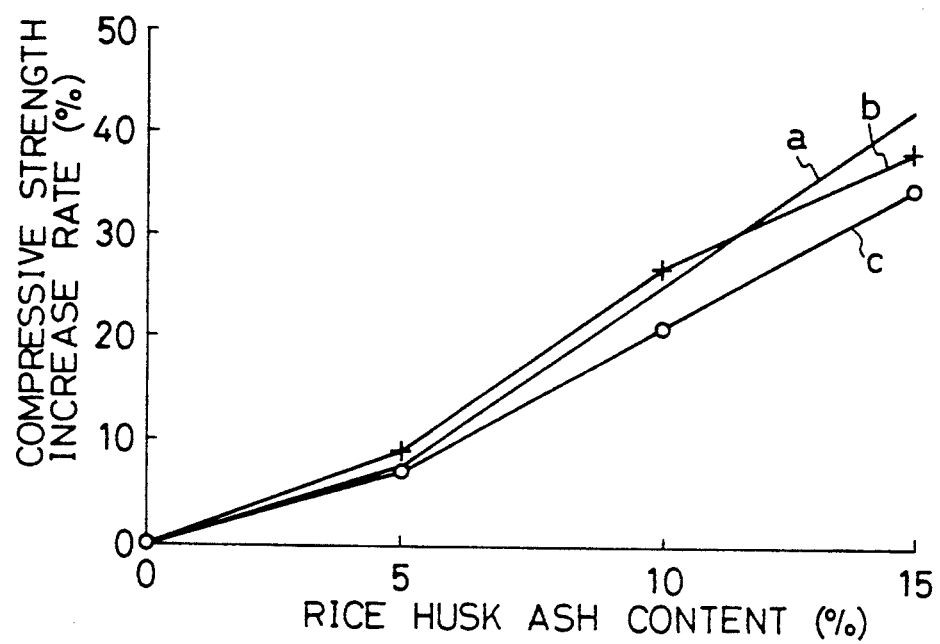
FIGS. 4(a) and 4(b) are graphs showing how the compression strength of concrete incorporating rice husk ash produced by the continuous production method of the present invention varies with the rice husk ash (RHA) content.
Figure 4B:
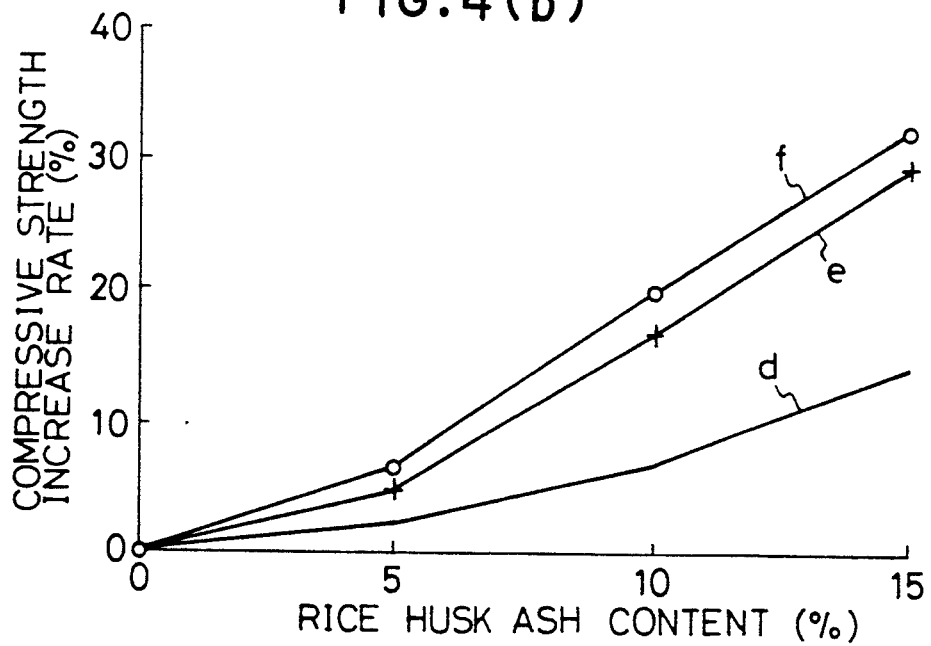

The graphs of FIGS. 4(a) and 4(b) relate to concretes incorporating rice husk ash produced using rotary kilns and show how the ratio of the compression strength of concrete containing rice husk ash to the compression strength of plain concrete (not containing rice husk ash) increases with increasing rice husk ash content. FIG. 4(a) shows the compressive strengths of concretes aged 7 days (about 1 week), curve a being for concretes having a water binder ratio of 45%, curve b for concretes having a water binder ratio of 55%, and curve c for concretes having a water binder ratio of 65%. FIG. 4(b) shows the compressive strengths of concretes aged 91 days (just over three months), curve d being for concretes having a water binder ratio of 45%, curve e for concretes having a water binder ratio of 55%, and curve f for concretes having a water binder ratio of 65%. In each of these graphs, the vertical axis represents compressive strength increase rate (i.e., 0% on the vertical axis corresponds to the strength of plain concrete) and the horizontal axis represents rice husk ash content (weight ratio of rice husk ash to cement).

FIG. 4(a) shows that the rate of increase in compressive strength with increasing rice husk ash content was approximately the same for all of the 7-day-old concretes regardless of water binder ratio. Particularly noteworthy is that the concretes having a 15% rice husk ash content exhibited about a 40% increase in compressive strength.

FIG. 4(b) shows that while 91-day-old concretes exhibited a pronounced increase in compressive strength with increasing rice husk ash content, the increase for the concretes having a water binder ratio of 45% was smaller than that for the concretes with water binder ratios of 55% and 65%. This tendency is observed not only for rice husk ash but also for other pozzolan materials. The concretes with water binder ratios of 55% and 65% exhibited an approximately 30% increase in strength at a rice husk content of 15%, indicating that the rice husk ash exhibited very high chemical activity.

The compressive strength continues to rise when the rice husk ash content is increased even further.

Figure 5:
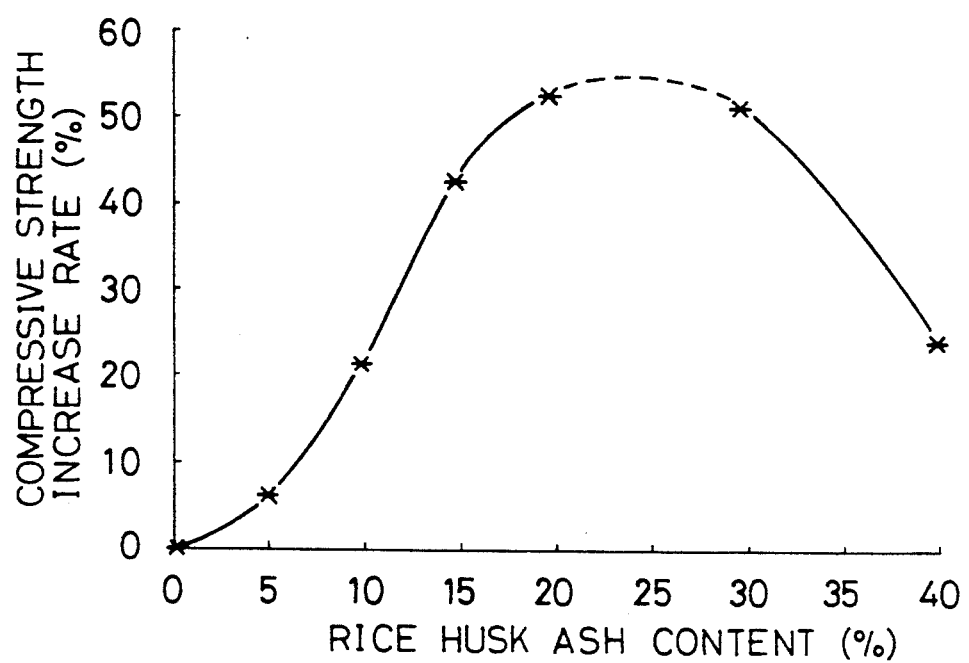
FIG. 5 is a graph showing how the compression strength of concrete incorporating rice husk ash produced by the batch production method of the present invention varies with the RHA content.

The graph of FIG. 5 shows the compressive strengths of 28-day-old concretes containing rice husk ash produced by the batch method and having a water binder ratio of 55%. Concretes with rice husk ash contents ranging between 0% and 40% were tested. The compressive strength of the concretes increased up to a rice husk ash content of 20%, at which it was 50% higher than that of plain concrete, and then stayed substantially the same between 20% and 30%. The concrete with a 40% rice husk ash content achieved only a 25% increase in compressive strength. The concretes with the highest compressive strength were those with a rice husk ash content in the vicinity of 25%. They exhibited more than a 55% increase in compressive strength.

It is clear from the foregoing that when rice husk ash produced according to the method of the present invention is used as an aggregate in concrete it imparts the concrete with a pronounced increase in compressive strength.

What is claimed is:

1. A method of producing active rice husk ash comprising the steps of placing a hollow platform having many holes of a size too small for rice husk to enter on an enclosed floor slab, erecting a chimney on the hollow platform in communication with the interior of the hollow platform, forming a cone of rice husk around the chimney to completely cover the hollow platform, igniting the rice husk at the small holes for smolderingly incinerating the rice husk into carbonized rice husk, and allowing the carbonized rice husk to self-burn into ash.

2. A method of producing active rice husk ash comprising the steps of connecting downstream and upstream rotary kilns in tandem, heating the upstream rotary kiln to a controlled temperature for carbonizing rice husk, heating the downstream rotary kiln to a controlled temperature for burning rice husk into ash, supplying rice husk to the upstream rotary kiln to be smolderingly incinerated into carbonized rice husk therein, supplying the carbonized rice husk to the downstream rotary kiln to be burned into ash therein, and discharging the resulting active rice husk ash from the downstream rotary kiln.

3. A method of producing active rice husk ash according to claim 2, wherein the upstream rotary kiln is heated to a temperature of 300°–400° C. and the downstream rotary kiln is heated to a temperature of about 600° C.

* * * * *